United States Patent [19]

Stahle et al.

[11] 3,717,633
[45] Feb. 20, 1973

[54] 2-ANILINO-1,3-DIAZACYCLOPENTENE-(2) DERIVATIVE

[75] Inventors: Helmut Stahle; Herbert Koppe; Karl Zeile; Martin Wolf, all of Ingelheim/Rhine; Wolfgang Hoefke, Budenheim/Rhine; Hans-Wolfgang Samtleben, Ingelheim/Rhine, all of Germany

[73] Assignee: Boehringer Ingelheim G.m.b.H., Ingelheim am Rhine, Germany

[22] Filed: Nov. 19, 1970

[21] Appl. No.: 91,189

Related U.S. Application Data

[63] Continuation of Ser. No. 854,035, Aug. 28, 1969, abandoned, which is a continuation of Ser. No. 801,864, Feb. 24, 1969, abandoned, which is a continuation-in-part of Ser. No. 583,427, Sept. 30, 1966, abandoned.

[30] Foreign Application Priority Data

Oct. 1, 1965   Germany..............................B 83964
Oct. 1, 1965   Germany..............................B 83965

[52] U.S. Cl.............260/253, 260/309.6, 260/552 R, 260/553 A, 260/564 E, 424/253, 424/273

[51] Int. Cl. ..............................................C07d 49/34
[58] Field of Search...................................260/309.6

[56] References Cited

UNITED STATES PATENTS 2,899,426   8/1959   Bloom..............................260/309.6

FOREIGN PATENTS OR APPLICATIONS 6,411,516   4/1965   Netherlands......................260/309.6
625,631     8/1961   Canada.............................260/309.6

OTHER PUBLICATIONS

Najer et al., Chem. Abst. Vol. 57, Columns 802–803 (1962) QD1.A51.
Netherlands Application 6411516 April 1965, (Pages 1–11 relied on).

*Primary Examiner*—Natalie Trousof
*Attorney*—Hammond & Littell

[57] ABSTRACT

The compounds are 2-(disubstituted-anilino)-1,3-diazacyclopentenes-(2) and acid addition salts thereof, useful as hypotensives in warm-blooded animals.

1 Claim, No Drawings

2-ANILINO-1,3-DIAZACYCLOPENTENE-(2) DERIVATIVE

This is a continuation of copending application Ser. No. 854,035 filed Aug. 28, 1969, now abandoned; which in turn is a continuation of copending application Ser. No. 801,864 filed Feb. 24, 1969, now abandoned; which in turn is a continuation-in-part of copending application Ser. No. 583,427 filed Sept. 30, 1966, now abandoned.

This invention relates to novel derivatives of 2-anilino-1,3-diazacyclopentene-(2) and salts thereof, as well as to various methods of preparing these compounds.

More particularly, the present invention relates to a selected group of 2-anilino-1,3-diazacyclopentene-(2) substitution products comprised of (I$a$) 2-(2′, 3′-dichloro-anilino)-1,3-diazacyclopentene-(2), (I$b$) 2-(2′Bromo-4′-chloro-anilino)-1,3-diazacyclopentene-(2), (I$c$) 2-(2′Methyl-5′-chloro-anilino)-1,3-diazacyclopentene-(2), (I$d$) 2-(2′-Chloro-3′-methyl-anilino)-1,3-diazacyclopentene-(2), (I$e$) 2-(2′-Chloro-5′-methyl-anilino)-1,3-diazacyclopentene-(2), and salts, especially non-toxic, pharmacologically acceptable acid addition salts, of each of these compounds.

The compounds according to the present invention may be prepared by any of the known methods for the preparation of 2-arylamino-1,3-diazacyclopentenes, such as those described in U. S. Pat. Nos. 2,899,426, 3,202,660 and 3,236,857. However, the following methods have proved to be particularly convenient and efficient:

Method A

By reaction an isothiouronium salt of the formula

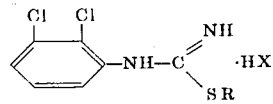 (IIa)

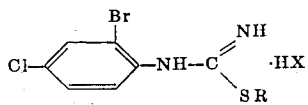 (IIb)

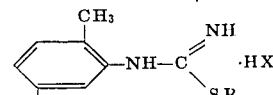 (IIc)

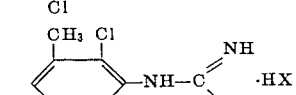 (IId)

or

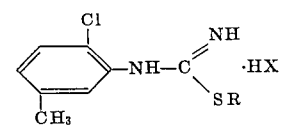 (IIe)

wherein R is lower alkyl, and X is the anion of an acid, preferably the anion of a hydrohalic acid, with ethylene-diamine.

The reaction may be carried out with or without an inert solvent. Thus, the reaction may be effected by simply heating a mixture of the reactants to between 100 and 200° C, whereby satisfactory yields of the desired end product are obtained. Alternatively, the reaction may also be carried out at relatively low temperatures (60°–140° C) in the presence of a suitable inert solvent, preferably one which contains polar groups, such as water or a lower alkanol; however, under these conditions longer reaction periods must be accepted if good yields are to be achieved.

The isothiouronium salts of the formulas IIa through IIe may themselves be prepared by customary methods, such as be heating a thiourea derivative of the formulas IIIa through IIIe below, obtained from a correspondingly substituted aniline and ammonium thiocyanate (Houben-Weyl, Vol. 9, p. 887), with an alkylating agent, such as a lower alkyl halide or a di-lower alkyl sulfate.

Method B

By reacting an N-phenyl-thiourea compound of the formula

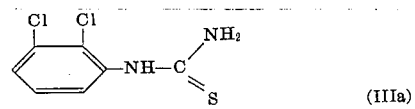 (IIIa)

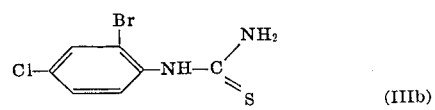 (IIIb)

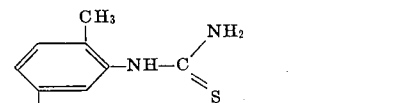 (IIIc)

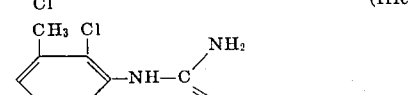 (IIId)

or

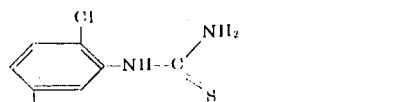 (IIIe)

with ethylenediamine. The reaction is advantageously performed by heating a mixture of the reactants, preferably in a vacuum, using a stoichiometric excess of ethylenediamine.

The N-phenyl-thiourea compounds of the formulas IIIa through IIIe may be obtained from a correspondingly substituted aniline and ammonium thiocyanate, as indicated above.

Method C

By subjecting an N-phenyl-N′-(β-amino-ethyl)-urea or -thiourea compound of the formula

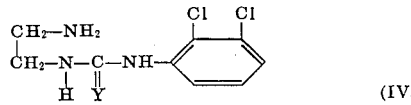 (IVa)

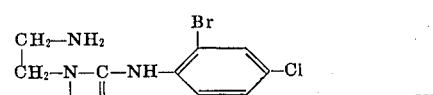 (IVb)

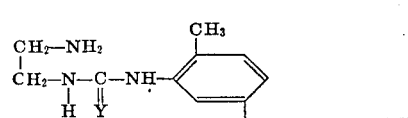 (IVc)

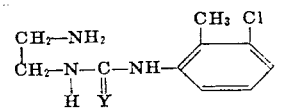

(IVd)

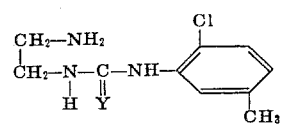

(IVe)

wherein Y is oxygen or sulfer, to pyrolysis to effect ring closure of the diazacyclopentene ring.

A starting compound of the formulas IVa through IVe may itself be obtained by reacting a correspondingly substituted phenyl-isocyanate or phenyl-isothiocyanate with ethylenediamine, pursuant to the method described in Journal of Organic Chemistry, Vol 24, page 818 (1959).

The end products obtained by methods A through C, that is, the compounds embraced by formulas Ia through Ie, are organic bases and form non-toxic salts, especially non-toxic, pharmacologically acceptable acid addition salts, with various inorganic or organic acids and synthetic acid resins. Examples of non-toxic, pharmacologically acceptable acid addition salts include, but are not limited to, those formed with hydrochloric acid, hydrobromic acid, phosphoric acid, sulfuric acid, nitric acid, oxalic acid, 8-chlorotheophylline or the like. An example of a non-toxic salt with an acid synthetic resin is that formed with a cross-linked polystyrene polymer containing sulfonic acid groups, such as "Zeo-Karb 225" (manufactured by The Permutit Co., New York).

The following examples further illustrate the present invention and will enable others skilled in the art to understand it more completely. It should be understood, however, that the invention is not limited to the particular examples given below.

EXAMPLE 1

Preparation of 2-(2', 3'-dichloro-anilino)-1,3-diazacyclopentene-(2) by method A A mixture of 36.3 mg (0.1 mol) of N-(2,3-dichlorophenyl)-S-methyl-isothiouronium hydroiodide, 10 cc of ethylenediamine (150 percent of the stoichiometrically required amount) and 100 cc of methanol was refluxed for 6 hours. Thereafter, the methanol and the excess unreacted ethylene-diamine were distilled off in vacuo, the residue was taken up in 1 N hydrochloric acid, the insoluble matter was filtered off, and the filtrate was made alkaline with 5 N sodium hydroxide. The precipitate formed thereby was isolated by vacuum filtration, washed with water, and recrystallized from benzene in the presence of animal charcoal. 9.3 gm (40.4% of theory) of 2-(2',3'-dichloro-anilino)-1,3-diazacyclopentene-(2), m.p. 156°-158° C, of the formula

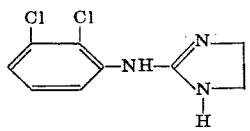

were obtained.

Its hydrochloride, obtained by dissolving the free base in ether and acidifying the solution with ethereal hydrochloric acid, had a melting point of 227°-227.5° C.

EXAMPLE 2

Preparation of 2-(2'-chloro-5'-methyl-anilino)-1,3-diazacyclopentene-(2) by method A 5.5 gm (0.016 mol) of N-(2-chloro-5-methyl-phenyl)-S-methyl-isothiouronium hydroiodide were admixed with 1.6 cc of ethylenediamine and 20 cc of methanol, and the mixture was refluxed for 16 hours. Thereafter, the methanol and the unreacted excess ethylenediamine were evaporated in vacuo, the residue was taken up in a small amount of methanol, and the methanolic solution was made alkaline with aqueous 50 percent potassium hydroxide, whereby an oily precipitate separated out. The reaction mixture was cooled with ice, whereby the oily substance crystallized; the crystalline product was separated by vacuum filtration, washed with water and petroleum ether, and dried. The raw product was recrystallized from a mixture of benzene and petroleum ether (boiling point range 40°-80° C), yielding 22.0 percent of theory of 2-(2'-chloro-5'-methyl-anilino)-1,3-diazacyclopentene-(2), m.p. 187-190°C, of the formula

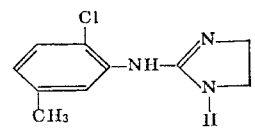

Its hydrochloride had a melting point of 178°-180° C.

EXAMPLE 3

Using a procedure analogous to that described in Example 2, 2-(2'-methyl-5'-chloro-anilino)-1,3-diazacyclopentene-(2), m.p. 176°-178° C, was prepared from N-(2-methyl-5-chloro-phenyl)-S-methyl-isothiouronium hydroiodide and ethylenediamine. The yield was 34.9 percent of theory.

Its hydrochloride had a melting point of 181°-182° C.

EXAMPLE 4

Preparation of 2-(2'-chloro-3'-methyl-anilino)-1,3-diazacyclopentene-(2) by method A 58.0 gm of 2-amino-3-nitro-toluene were subjected to the Sandmeyer Reaction with Cu-(I)-Cl, yielding 20 gm (24.4 percent of theory) of 2-chloro-3-nitro-toluene. The reaction product was subjected to catalytic hydrogenation in the presence of Raney nickel at normal pressure until the theoretical amount of hydrogen had been absorbed, yielding 2-chloro-3-methyl-aniline.

0.05 mol of 2-chloro-3-methyl-aniline hydrochloride were admixed with 4 gm of ammonium thiocyanate (105 percent of the stoichiometrically required amount) and 100 cc of chlorobenzene, and the mixture was heated at 95°-100° C, for about 7 hours.

Thereafter, the reaction mixture was allowed to cool, and the precipitate formed thereby was separated by vacuum filtration and washed with water and petroleum ether. The raw reaction product thus obtained was digested with 100 cc of water, 100 cc of petroleum ether were added, the solution was made alkaline with sodium carbonate, and the precipitate formed thereby was collected by vacuum filtration.

0.013 mol of the N-(2-chloro-3-methyl-phenyl)-isothiourea, m.p. 150°–152° C, thus obtained were admixed with 20 cc of methanol and 1.2cc of methyliodide, and the mixture was boiled for 1.5 hours. Thereafter, the reaction solution was evaporated in vacuo and dried. The residue, N-(2-chloro-3-methyl-phenyl)-S-methyl-isothiouronium hydroiodide (quantitative yield), was admixed with 15 cc of methanol and 1.3 cc of ehtylenediamine, and the mixture was refluxed for 16 hours. Thereafter, the methanol was distilled off in vacuo, the residue was dissolved in a small amount of methanol, the solution was made alkaline with aqueous 50 percent potassium hydroxide, allowed to cool and then vigorously stirred with petroleum ether. The precipitate formed thereby was collected by vacuum filtration, washed and dried, yielding 77.0 percent of theory, based on the amount of isothiouronium salt, of 2-(2'-chloro-3'-methyl-anilino)-1,3-diazacyclopentene-(2), m.p. 159°–161° C, of the formula

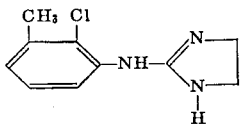

The free base was dissolved in ether, the solution was acidified with ethereal hydrochloric acid, and the precipitate formed thereby was collected and recrystallized from methanol/ether, yielding the hydrochloride of 2-(2'-chloro-3'-methyl-anilino)-1,3-diazacyclopentene-(2), m.p. 220° C, which was thin-film-chromatographically pure.

EXAMPLE 5

Using a procedure analogous to that described in Example 1, 2-(2'-bromo-4'-chloro-anilino)-1,3-diazacyclopentene-(2) was prepared from N-(2-bromo-4-chloro-phenyl)-S-methyl-isothiouronium hydroiodide and ethylenediamine.

The compounds according to the present invention, that is, those identified as Ia through Ie above and their non-toxic, pharmacologically acceptable acid addition salts, have useful pharmacodynamic properties. More particularly, the compounds according to the present invention exhibit hypotensive activities in warm-blooded animals, there advantage over known compounds of similar structure is that the gastric juice secretion-inhibiting side effect is substantially less pronounced than in said related known compounds, as demonstrated by the following comparative tests.

The tests served for the determination of the influence of the test compounds upon the gastric juice output of the stomach of rats pursuant to the method of Shay et al, Gastroenterology, Vol 5, page 43 (1945). The tests were made on juvenile rats having a body weight of 100 to 150 gm. For at least two days prior to the start of the tests the rats were fed only white bread, and during the last 24 hours they received only distilled water in order to empty the stomach. Ten rats per dose were used.

The test compounds were injected subcutaneously at dosage levels of 10, 3, 1, 0.3 and 0.1 mgm/kg in physiological saline solution. The animals were anesthetized with ether, and then an incision was made in the abdominal wall below the sternum along the linea alba. A ligature was applied around the pylorus. The abdominal muscles and the skin were then successively carefully clamped or sutured. The animal was weighted, and the corresponding dose of the compound to be tested was injected. In each test series two control animals were administered only physiological saline solution.

After four hours the rats were killed with ether. The abdominal cavity was opened, the cranial esophagus of the cardia was clamped off, the esophagus and the duodenum were severed from the stomach, the stomach contents were emptied into a graduated cylinder, and the volume was recorded. The stomach was then rinsed twice with distilled water, and the rinses were added to the contents of the graduated cylinder. The contents of the cylinder were then filtered into a small Erlenmeyer flask, the graduated cylinder, the funnel and the filter were rinsed with distilled water, and the rinse water was added to the contents of the flask. About two drops of a mixed indicator (p-di-methylamino-azobenzene and phenolphthalein) were added to the contents of the flask, and the solution was titrated against 0.1 N sodium hydroxide. The first end point, indicated by a color change from red to salmon, occurred at pH 2.9; the second end point, indicated by a color change from salmon to yellow, occurred at pH 4.0; and the third end point, indicated by a color change from yellow to pink, occurred at pH 8.5. The consumption of sodium hydroxide up to the first end point indicated the amount of free hydrochloric acid in the stomach contents. In order to determine the amount of bonded HCl, the median value of the second and third end point was calculated, from which the amount of free HCl was subtracted. The total consumption of NaOH at the third end point was designated as the total acidity.

The $ED_{50}$-values shown in the following table were graphically determined from the individual test dosages and represent the dose of the test compound which produces a 50 percent reduction in the secreted gastric juice volume or a 50 percent decrease in the total acidity, compared to the controls. The smaller the $ED_{50}$, the greater the gastric juice secretion-inhibiting activity of the particular compound. The last column in the table also shows the average of the two $ED_{50}$ values given.

TABLE I

| Compound | Gastric juice volume | $ED_{50}$ in mgm/kg Total Acidity | Average |
|---|---|---|---|
| Prior art:Dutch Application No. 6,411,516 2-(2',6'-Dichloro-anilino)-1,3-diazacyclopentent-(2)·HCl | 0.043 | 0.036 | 0.039 |

| | | | |
|---|---|---|---|
| 2-(2'-Chloro-6'-methyl-anilino)-1,3-diazacyclo-pentene-(2)·HCl | 0.115 | 0.057 | 0.086 |
| 2-(2'-Chloro-4'-methyl-anilino)-1,3-diazacyclo-pentene-(2)·HCl | 0.200 | 0.180 | 0.190 |
| Present invention: | | | |
| 2-(2'-Methyl-5'-chloro-anilino)-1,3-diazacyclo-pentene-(0)·HCl | 5.8 | 3.3 | 4.6 |
| 2-(2'Chloro-3'-methyl-anilino)-1,3-diazacyclo-pentene-(2)·HCl | 5.0 | 3.7 | 4.35 |

The hypotensive activity of the compounds according to the present invention was ascertained by direct measurement of the blood pressure changes in the carotid artery of rabbits after administration of the compounds. All of the compounds of the instant invention were found to be effective hypotensives.

The test method was carried out as follows: Bastard rabbits of both sexes, with a body weight of about 2 to 3 kg were first weighed and then anesthetized with 0.75 gm/kg of urethane i.p.

The fur on the neck of the animals was removed, a longitudinal incision 7 to 10 cm long was made, and the trachea was exposed into which a respiration canula was tied in order to be able to apply artificial respiration to the animal in an emergency. One of the two carotid arteries lying on both sides of the trachea was exposed, and the canula of a manometer was tied into it. The jugular vein was exposed from the fatty tissue, and a canula, provided with a stopcock, was tied into it as a means for intravenous administration of the test compounds.

The body temperature of the animal was continuously measured rectally and, if necessary, was maintained at 37° to 38° C. with a heating pad.

The compound under investigation was injected into the jugular vein at dosages of 0.01, 0.03, 0.1, 1 and 3 mgm/kg body weight in increasing as well as decreasing sequence, and the resulting blood pressure changes were recorded. Between injections, a waiting period equal to double the period of effective action was used before the next injection was administered. One compound was tested on each animal, and from 2 to 9 tests per compound were performed.

In addition to the compounds of the present invention, 2-(2'-methyl-3'-chloro-anilino)-1,3-diaza-cyclopentene-(2), disclosed by Najer et al in Bull. Soc. Chim. France 1951, 2114 et seq., was tested for its effect upon the blood pressure. The following table shows the results obtained with this compound as well as those obtained with the analogous 2',3'-dichloro-compound according to the present invention.

TABLE II

| Compound | Number of Tests | Dosage mgm/kg | Blood Pressure Change mm.Hg |
|---|---|---|---|
| Prior art: Najer et al 2-(2'-Methyl-3'-chloro-anilino)-1,3-diazacyclo-pentene-(2) | 5 | 0.01 | 0 |
| | 6 | 0.03 | +4.5 ± 2.6 |
| | 4 | 0.1 | +14.7 ± 5.6 |
| | 4 | 0.3 | +31.5 ± 10.9 |
| | 3 | 1 | +35.6 ± 11.9 |
| | 3 | 3 | +32.3 ± 5.5 |
| Present invention: 2-(2',3'-Dichloro-anilino)-1,3-diaza-cyclopentene-(2) | 9 | 0.001 | −4.1 ± 3.5 |
| | 9 | 0.003 | −7.9 ± 0.72 |
| | 9 | 0.01 | −11.9 ± 1.21 |
| | 8 | 0.03 | −21.1 ± 2.78 |
| | 8 | 0.1 | −38.6 ± 4.8 |
| | 6 | 0.3 | −35.2 ± 5.0 |

These results clearly show that the compound according to the present invention has a blood pressure reducing effect, whereas the Najer et al compound has exactly the opposite effect.

For pharmaceutical purposes the compounds according to the present invention are administered perorally warm-blooded animals peroprally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.00083 to 0.84 mgm/kg body weight. A dosage unit composition comprising a compound according to the invention as an active ingredient may, if desired, also contain an effective unit dose of another pharmacodynamically active ingredient, such as a saluretic agent, i.e., a compound which promotes the discharge of salt through the urine.

The following examples illustrate a few dosage unit compositions comprising a compound of the instant invention as an active ingredient and represent the best mode contemplated of putting the invention to practical use. The parts are parts by weight unless otherwise specified.

EXAMPLE 6

Tablets

The tablet composition was compounded from the following ingredients:

| | |
|---|---|
| 2-(2',3'-Dichloro-anilino)-1,3-diazacyclopentene-(2) hydrochloride | 0.15 parts |
| Lactose | 53.00 " |
| Corn starch | 31.60 " |
| Soluble starch | 4.00 " |
| Magnesium stearate | 1.00 " |
| Total | 89.75 parts |

The individual ingredients were admixed with each other in a manner customary for manufacture of pharmaceutical tablets, and the mixture was pressed into 89.75 mgm-tablets. Each tablet contained 0.15 mgm of the diazacyclopentene compound and, when administered perorally to a warm-blooded animal of about 60 kg body weight in need of such treatment, produced very good hypotensive effects without appreciably reducing the gastric juice secretion rate in the stomach.

EXAMPLE 7

Drop Solution

The solution was compounded from the following ingredients:

| | |
|---|---|
| 2-(2'-Bromo-4'-chloro-anilino)-1,3-diazacyclopentene-(2) hydrochloride | 0.10 parts |
| p-Hydroxy-benzoic acid methyl ester | 0.07 " |
| p-Hydroxy-benzoic acid propyl ester | 0.03 " |
| Demineralized water q.s.ad | 100.00 " |
| | by vol. |

The individual ingredients were dissolved in a sufficient amount of demineralized water, the solution was diluted with additional demineralized water to the desired volume, and the finished solution was filtered. 1 cc of solution (about 20 drops) contained 1.0 mgm of the diazacyclopentene compound and, when administered perorally to a warm-blooded animal of about 60 kg body weight in need of such treatment, produced very good hypotensive effects without appreciably reducing the gastric juice secretion rate in the stomach.

EXAMPLE 8

Hypodermic Solution

The solution was compounded from the following ingredients:

| | |
|---|---|
| 2-(2'-Methyl-5'-chloro-anilino)-1,3-diazacyclopentene-(2) hydrochloride | 0.05 parts |
| Sodium chloride | 18.00 " |
| Distilled water q.s.ad | 2000.00 " by vol. |

The individual ingredients were dissolved in a sufficient amount of distilled water, the solution was diluted with additional distilled water to the desired volume, the dilute solution was filtered until free from suspended particles and then filled into 2 cc-ampules, which were subsequently sterilized and sealed. Each ampule contained 0.05 mgm of the diazacyclopentene compound, and when the contents thereof were administered by intravenous injection to a warm-blooded animal of about 60 kg body weight in need of such treatment, very good hypotensive effects were obtained without appreciably reducing the gastric juice secretion rate in the stomach.

EXAMPLE 9

Suppositories

The suppository composition was compounded from the following ingredients:

| | |
|---|---|
| 2-(2'-Chloro-3'-methyl-anilino)-1,3-diazacyclopentene-(2) | 0.3 parts |
| Lactose | 244.2 " |
| Cocoa butter q.s.ad | 1700.00 " |

The cocoa butter was melted, the remaining ingredients were stirred into it, the mixture was homogenized, and the finished composition was poured into cooled suppository molds, each holding 1700 mgm of the composition. Each suppository contained 0.3 mgm of the diazacyclopentene compound and, when administered by the rectal route to a warm-blooded animal of about 60 kg body weight in need of such treatment, produced very good hypotensive effects without appreciably reducing the gastric juice secretion rate in the stomach.

Analogous results were obtained when an equal amount of any one of the other compounds identified as Ia through Ie above or a non-toxic acid addition salt thereof was substituted for the particular diazacyclopentene compounds in Examples 6 to 9. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:
1. 2-(2'-Chloro-3'-methyl-anilino)-1,3-diazacyclopentene-(2) or a non-toxic, pharmacologically acceptable acid addition salt thereof.

* * * * *

UNITED STATES PATENT OFFICE
CERTIFICATE OF CORRECTION

Patent No. 3,717,633  Dated Feb. 20, 1973

Inventor(s) HELMUT STÄHLE, HERBERT KÖPPE, KARL ZEILE, MARTIN WOLF, WOLFGANG HOEFKE and HANS-WOLFGANG SAMTLEBEN It is certified that error appears in the above-identified patent and that said Letters Patent are hereby corrected as shown below:

Col. 2, line 11, correct "be" to read --by--.

Col. 5, line 60, correct "there" to read --their--.

Col. 6, line 69, correct "diazacyclopentent" to read --diazacyclopentene--.

Col. 7, line 9, correct "pentene-(0)-HCl" to read --pentene-(2)-HCl--.

Col. 8, line 10, correct "perorally" to read --to--; correct "peroprally" to read --perorally--.

Signed and sealed this 20th day of November 1973.

(SEAL)
Attest:

EDWARD M. FLETCHER, JR.
Attesting Officer

RENE D. TEGTMEYER
Acting Commissioner of Patents